United States Patent Office 3,687,868
Patented Aug. 29, 1972

3,687,868
IMPREGNATION WITH TIN FOR STRONG OXIDATIVE DEHYDROGENATION CATALYSTS
Emory W. Pitzer, Bartlesville, Okla., assignor to Phillips Petroleum Company
No Drawing. Filed June 22, 1970, Ser. No. 48,543
Int. Cl. B01j 11/82
U.S. Cl. 252—435        5 Claims

ABSTRACT OF THE DISCLOSURE

A tin/phosphorus/Group Ia or IIa oxidative dehydrogenation catalyst, subsequent to heating, is impregnated with additional tin and then is heated to improve the physical integrity of the catalyst.

---

This invention relates to an improved oxidative dehydrogenation catalyst. In another aspect, this invention relates to a process for the production of an improved oxidative dehydrogenation catalyst.

Heretofore, oxidative dehydrogenation catalysts have been formed from phosphoric acid and tin oxide. These catalysts were improved by forming the oxidative dehydrogenation catalysts from a phosphorus-containing material, a tin-containing material, and a Group Ia or IIa metal or metal-containing material.

It now has been found that these oxidative dehydrogenation catalysts are improved by heating the catalysts, impregnating the heated catalysts with tin or a tin-containing material to provide the catalysts with 0.25 to 10 weight percent of additional tin based on the weight of the initial catalyst, and heating the thus-treated catalysts.

The process of this invention provides a novel catalyst with improved physical integrity, i.e., improved physical strength. Such a catalyst will have a longer life in conventional catalytic reactors. Further, the thus-treated catalyst is less susceptible to pulverization during handling or shipping.

The thus-treated catalyst is useful for oxidatively dehydrogenating a variety of hydrocarbons, for example, olefins such as alkenes, and cycloalkenes and the like.

Accordingly, it is an object of this invention to provide a process for the production of an oxidative dehydrogenation catalyst.

Another object of this invention is to provide an oxidative dehydrogenation catalyst.

Other objects, aspects and advantages of this invention will become apparent to one skilled in the art upon consideration of the disclosure and appended claims.

Substantially any phosphorus, tin, and Group Ia or IIa containing materials can be employed in preparing the catalyst to be treated according to this invention so long as at least one of the materials used contains oxygen, none of the materials is deleterious to dehydrogenation catalytic effects, and all of the elements in the materials used other than phosphorus, tin, oxygen, and Group Ia or IIa metals are volatilized by heating the catalysts to at least the temperature at which the catalyst is used, e.g., 1000° F., or are removed by washing the catalyst, e.g., with water.

Suitable phosphorus-containing materials employed to prepare the catalyst include, besides phosphoric acid, phosphorus pentoxide, the phosphorus halides, and the Group Ia and IIa metal phosphates such as lithium phosphate, sodium phosphate, potassium phosphate, rubidium phosphate, cesium phosphate, magnesium phosphate, calcium phosphate, and the like. Other phosphorus-containing materials that can be employed to prepare the catalyst to be treated according to this invention are ammonium phosphate and mono-and dibasic phosphates of ammonia and of Group Ia and IIa metals such as lithium monobasic phosphate, sodium dibasic phosphate, beryllium dibasic phosphate, magnesium dibasic phosphate, barium monobasic phosphate, ammonium phosphate, ammonium dibasic phosphate, and the like.

The tin materials employed to prepare the catalysts to be treated according to this invention include any such material soluble or dispersible in water, alcohol, or ether, and include both stannous or stannic compounds. Representative examples of suitable tin compounds are, for sake of brevity, given only as the stannic compound but it is to be understood that the corresponding stannous compound is equally as applicable. Representative examples include stannic halides (stannic fluoride, stannic chloride, stannic bromide, stannic iodide), stannic sulfate, stannic acetate, stannic oxide, stannic tartrate, and stannic nitrate. The tin materials employed to prepare the catalyst to be treated according to this invention and in the impregnation step can be the same or different tin compound.

Besides elemental Group Ia or IIa metals, Group Ia or IIa metal-containing materials that can be used include the nitrates, the halides, the sulfates, the oxalates, the acetates, the carbonates, the propionates, the tartrates, the bromates, the chlorates, the oxides, the hydroxides, and the like.

The phosphorus-containing materials, the tin-containing materials, and the Group Ia ir IIa metal or metal-containing materials can be combined in any conventional manner which will yield catalytic combinations suitable for oxidative dehydrogenation processes. For example, the catalyst components can be combined using a coprecipitation technique as disclosed in detail hereinafter in the specific examples, by conventional aqueous or nonaqueous solution or suspension mixing, by ion exchange, by simply mixing the components by themselves without the use of additional solvents, and the like including combinations of these techniques.

Generally, the catalysts can be formed by mixing the components for periods varying from about 1 minute to 5 hours in the presence or absence of a solvent or dispersant, at temperatures from about room temperature up to about 200° F. Ambient, sub-ambient, or super-ambient pressures, and ambient or inert atmospheres such as nitrogen, and the like can be used.

Suitable solvents or dispersants that can be employed for the combining of the catalyst components include water, alcohol, or ethers for the step of combining the tin compound and phosphorus compound, and these solvents as well as hydrocarbons, halogenated hydrocarbons, ketones, esters, and the like for any other steps of the catalyst preparation.

The catalyst itself when finished and in a condition for treatment according to this invention will contain from about 0.1 to about 16 weight percent phosphorous, from about 15 to about 75 weight percent tin, and from about 0.1 to about 10 weight percent Group Ia and/or IIa metal, preferably 0.1 to 5 weight percent, all weight percentages being based upon the total weight of the final catalyst. The amounts of phosphorus, tin, and Group Ia and/or IIa metal present in the final catalyst total less than 100 percent of the catalyst, the differences between the total and the 100 percent being substantially combined oxygen in sufficient amount to satisfy the valence requirements of the Group Ia and/or IIa metal, tin, and phosphorus.

A presently preferred method of preparing the catalyst to be treated according to this invention is to mix solutions or suspensions of, for example, the phosphates and/or phosphoric acid, one or more tin compounds, one or more Group Ia and/or IIa metal or compound, and at least one of ammonia, ammonium hydroxide, sodium hydroxide and potassium hydroxide, filter, wash to remove any undesirable electrolytes, dry, and calcine. An agglomeration step such as pelletizing, extruding, or pilling, can precede or follow the drying step or calcining step.

The concentration of the various solutions that can be used to make the catalyst to be treated according to this invention can vary widely, e.g., from about 0.01 to about 10 molar or more, depending on the solubility of the particular materials employed. Any order of mixing can be used, and the final pH of the mixture is generally in the range of from about 2 to about 10, preferably from about 3.5 to about 6.5. The precipitate that forms is separated from the liquid by any conventional means such as filtration. Thereafter the precipitate is washed with dilute aqueous ammonium salt solutions such as ammonium acetate, ammonium nitrate, ammonium sulfate, and the like, and/or with deionized water to remove electrolytes. The washed precipitate is then dried for from about 2 to about 24 hours at temperatures of from about 100 to about 300° F. in air or an inert atmosphere such as nitrogen. The dried precipitate is then calcined from about 1 to about 24 hours at from about 600 to about 1300° F., preferably at about the temperature at which the catalyst is to be used in the dehydrogenation process, under ambient or inert atmospheres. As mentioned before, an agglomerate-forming step can precede or follow the drying or calcining step. The dried and calcined catalyst is preferably formed into 1/16- to 1/2-inch pellets by compression molding or extrusion, or is simply screened to a desired size, such as 10–28 mesh (Tyler Sieve Series, Mechanical Engineers Handbook by L. S. Marks, 4th Edition, McGraw-Hill Book Co., Inc., N.Y., 1941, p. 836). Optimally a particulate tin/phosphorus/oxygen material is formed, and the Group Ia and/or IIa metal-containinag compound or compounds is added by, for example, impregnation followed by drying.

By this invention, these oxidative dehydrogenation catalysts are treated by (a) heating the catalyst to 600 to 1300° F., preferably 1100 to 1200° F., (b) impregnating the heated catalyst with a tin-containing material to provide the catalyst with 0.25 to 10 weight percent of additional tin, and (c) heating the treated catalyst at temperatures in the range of 600 to 1300° F., preferably 1100 to 1200° F., in the presence of an oxygen-containing atmosphere.

Generally, the heating of step (a) is carried out for a time ranging from 1 to 24 hours. The heating of step (c) is carried out for a time ranging from 1 to 24 hours. If desired, the heating of step (a) can be the final heating step of the original preparation of the oxidative dehydrogenation catalyst to be treated according to this invention.

The impregnation step can be carried out with any tin-containing material which is converted by the subsequent heating step in an oxygen-containing atmosphere to tin oxide. For example, tin compounds such as stannous sulfate, stannic sulfate, stannous nitrate, stannic nitrate, stannous acetate, stannic acetate, stannous tartrate, stannic tartrate, and the like can be employed. Preferably, stannous sulfate and/or stannic sulfate are employed.

The improved catalysts of this invention can be used in any conventional dehydrogenation, particularly oxidative dehydrogenation, process using conventional procedures and techniques. Suitable oxidative dehydrogenation processes are those which dehydrogenate at least one material selected from the group consisting of alkenes, alkadienes, cycloalkenes, alkylpyridines, and alkyl aromatics, using an elevated temperature, and a molecular oxygen-containing gas, with or without the presence of steam. The alkenes and alkadienes can contain from 3 to 10, preferably 4 to 6, carbon atoms per molecule, inclusive, and the cycloalkenes can contain from 4 to 10, preferably 4 to 6, carbon atoms per molecule, inclusive. The alkylpyridines and alkylaromatics can contain from 1 to 4, preferably 1 to 2, alkyl groups per molecule which themselves contain from 1 to 6, preferably 4 to 6, carbon atoms per group, inclusive, with at least one alkyl group having at least 2 carbon atoms.

The advantages of this invention are further illustrated by the following examples. The reactants and the proportions and other specific conditions are presented as being typical and should not be construed to limit the invention unduly.

EXAMPLE

Catalyst preparations

Catalyst 1.—Aqueous solutions of stannic chloride and phosphoric acid were mixed and reacted with ammonium hydroxide to give a precipitate. The precipitate was filtered and washed essentially free of chlorine by resuspension in water and refiltering. The washed precipitate was spray-dried, mulled with about 5 percent water, extruded to an extrudate 1/16 inch in diameter and about 1/8 inch in length, and dried. The dried extrudate was impregnated with an aqueous solution of lithium nitrate to give the final desired composition. The impregnated extrudate was dried and calcined at 1100° F. in air for about 4 hours as the final preparation step. The final catalyst contained 10 percent phosphorus (22.9 percent $P_2O_5$) and 58.4 percent tin (73.9 percent $SnO_2$). The final composition also contained 1.5 percent lithium (3.2 percent $Li_2O$).

Catalyst 2.—Catalyst 1 was impregnated with an aqueous solution of stannous sulfate, dried, and calcined in air at 1100° F. for 16 hours. The solution used to impregnate contained 3.6 grams of $SnSO_4$ in 100 ml. of solution. The tin content was increased to 59.4 weight percent as compared to Catalyst 1 which contained 58.4 weight percent tin. This was an inventive catalyst of the invention.

Catalyst 3.—Catalyst 1 was impregnated with an aqueous solution of stannous sulfate, dried, and calcined in air at 1100° F. for 16 hours. The solution used to impregnate contained 7.2 grams of $SnSO_4$ in 100 ml. of solution. The resultant tin content was increased to 60.4 weight percent in this inventive catalyst.

Catalyst 4.—Catalyst 1 was impregnated with an aqueous solution of stannous sulfate, dried, and calcined in air at 1100° F. for 16 hours. The solution used for impregnation contained 14.4 grams of $SnSO_4$ in 100 ml. of solution. The resultant tin content was increased to 62.4 weight percent in this inventive catalyst.

Catalyst Testing I

Physical strength (pounds of pressure required to crush extrudates) as well as catalytic activity for dehydrogenation of butenes to butadiene are:

|  | Original extrudate, catalyst 1 | Strengthened extrudates | | |
|---|---|---|---|---|
|  |  | Catalyst 2 | Catalyst 3 | Catalyst 4 |
| Wt. percent added Sn | 0 | 1 | 2 | 4 |
| Tablet strength, lbs | 2.4 | 3.3 | 3.4 | 3.8 |
| Oxidative dehydrogenation activity [1]: | | | | |
| 900° F.: | | | | |
| Yield | 35 | 35 | | 42 |
| Modivity | 93 | 92 | | 94 |
| 1,000° F.: | | | | |
| Yield | 63 | 64 | | 73 |
| Modivity | 96 | 97 | | 95 |

[1] Conditions: Butene space velocity=300; air space velocity=1,200; steam space velocity=6,000; sample time in the dehydrogenation period=3 hours; pressure=atomospheric; quartz reactor; 7 mm. internal diameter; 3–4 in catalyst depth; 3–4 cc. of catalyst; product determination by gas liquid chromatography.

NOTE.—Space velocity is vol of gas/vol. of catalyst/hr. at STP.

NOTE.—Yield=Mole percent of butenes converted to butadiene, single-pass. Modivity= Selectivity to butadiene based on gas-phase products only.

The above data demonstrate that the catalysts of this invention perform as well as or better than the catalysts of the prior art. Further, the catalysts of this invention clearly have improved physical strength over the catalysts of the prior art.

Reasonable variations and modifications are possible within the scope of this disclosure without departing from the scope and spirit thereof.

I claim:

1. In a process for the production of an oxidative dehydrogenation catalyst which is a calcined composite of P/Sn/O/ and at least one Group Ia or Group IIa metal, said composite comprises, about 0.1 to 16 weight percent phosphorus, about 15 to 75 weight percent tin, and about 0.1 to 10 weight percent Group Ia or Group IIa metal, said oxygen being present as combined oxygen, wherein the improvement comprises impregnating said composite with a further tin containing material sufficient to provide said composite with about 0.25 to 10 weight percent of additional tin, said further tin containing material is a tin oxide or tin containing material convertible to the oxide on heating in an oxygen containing atmosphere, and heating the impregnated composite at a temperature ranging from about 600 to 1300° F., thereby preparing an oxidative dehydrogenation catalyst.

2. The process according to claim 1 wherein the heating is conducted in the presence of a molecular oxygen-containing atmosphere.

3. A process according to claim 1 wherein said heating is carried out at a temperature ranging from 1100 to 1200° F.; and the further tin containing material is stannous sulfate.

4. A process according to claim 1 wherein said calcined composite of P/Sn/O/ and at least one Group Ia or IIa metal is prepared from phosphoric acid, stannic chloride, and lithium nitrate.

5. An oxidative dehydrogenation catalyst produced by the process of claim 1.

References Cited

UNITED STATES PATENTS

| 3,501,547 | 3/1970 | Nolan et al. | 252—437 X |
| 3,513,215 | 5/1970 | Ogle | 260—680 E |
| 3,555,105 | 1/1971 | Nolan et al. | 252—437 X |

PATRICK P. GARVIN, Primary Examiner

U.S. Cl. X.R.

252—437; 260—680 E